Figure 3:
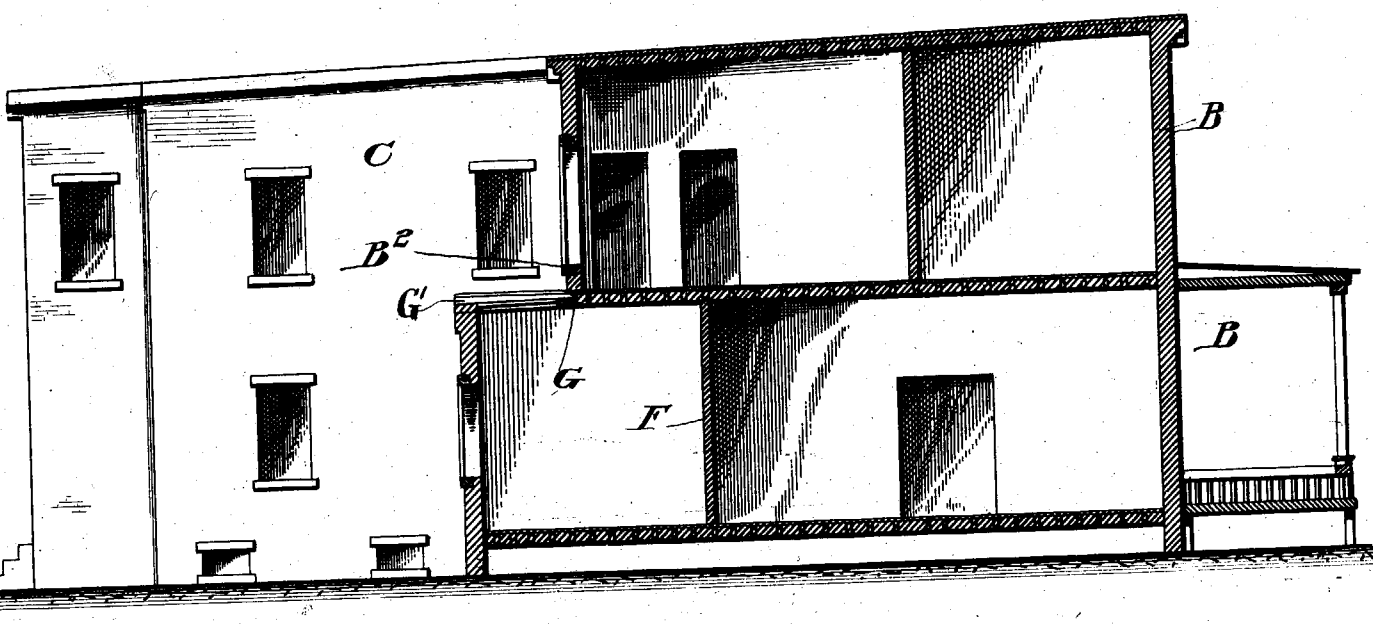

2 Sheets—Sheet 1.
J. I. COMLY.
HOUSE.
No. 11,304.
Reissued Feb. 7, 1893.
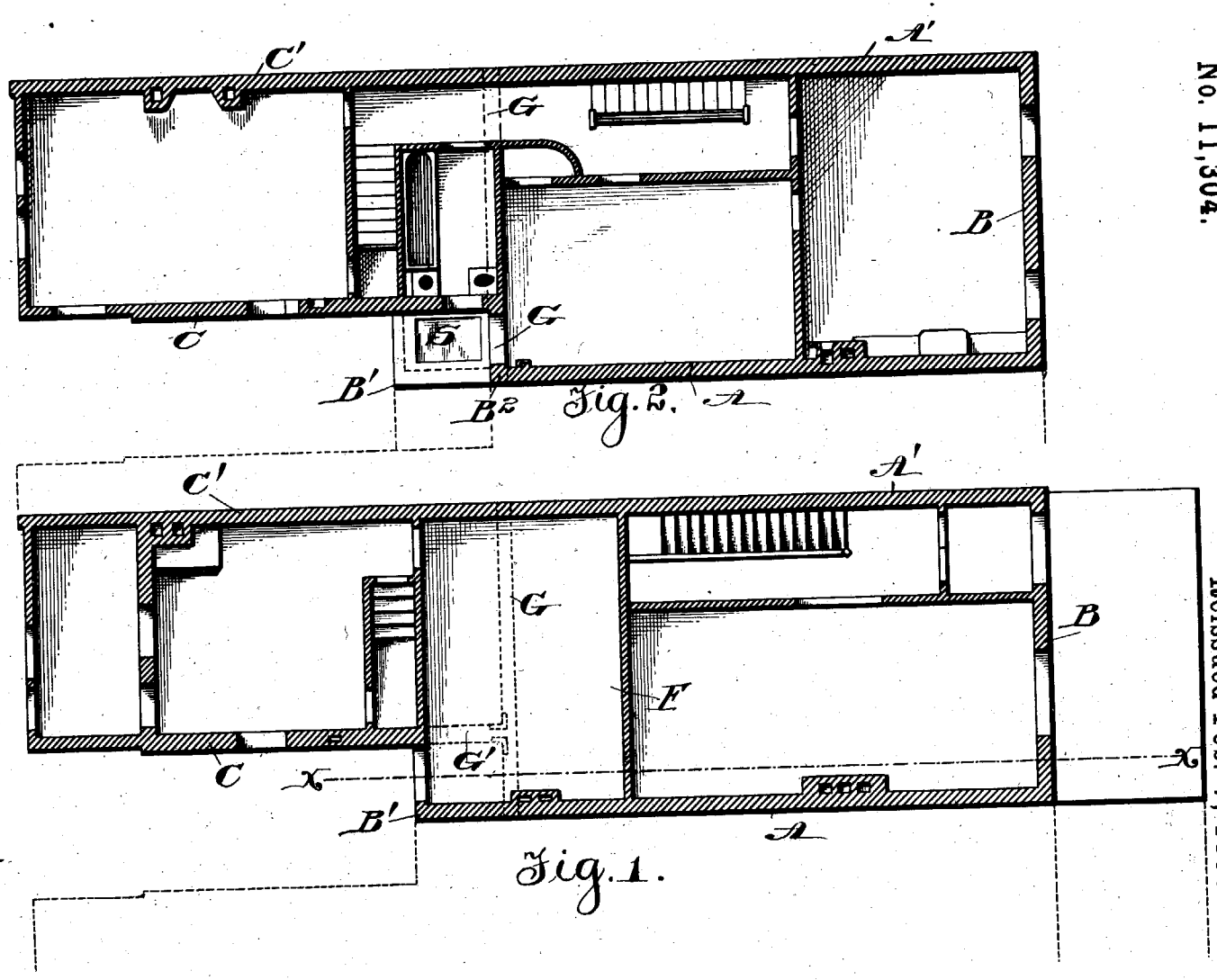
Witnesses:
Harry Brodhead
M. F. Ellis
Inventor:
James I. Comly
by his atty
G. H. Harding 2 Sheets—Sheet 2.

J. I. COMLY.

HOUSE.

No. 11,304. Reissued Feb. 7, 1893.

Witnesses:
Harry Brodhead
M. A. Ellis

Inventor.
James I. Comly
by his atty
G. H. Harding

UNITED STATES PATENT OFFICE.

JAMES I. COMLY, OF PHILADELPHIA, PENNSYLVANIA.

HOUSE.

SPECIFICATION forming part of Reissued Letters Patent No. 11,304, dated February 7, 1893.

Original No. 443,203, dated December 23, 1890. Application for reissue filed August 26, 1892. Serial No. 444,222.

*To all whom it may concern:*

Be it known that I, JAMES I. COMLY, of the city of Philadelphia and State of Pennsylvania, have invented a certain new and useful Improvement in Houses; and I do hereby declare the following to be a full, clear, and exact description thereof, reference being had to the accompanying drawings, forming part of this specification.

My invention has relation to the construction of houses and its advantages are manifest in such as have front and back buildings and are built in rows with a house or building adjoining them on each side, and consists in constructing a house having front and back buildings in which the front building of the first story is longer than the front building of the second or upper stories, and in which the rear wall of the front building of the second and upper stories is in front of the rear wall of the first story front building and over the back room of the first story front building; and the side wall of the back building in the second or upper stories is extended frontward also over the back room of the first story front building to the back wall of the front building of the second or upper stories.

The object of my invention is to provide a floor-space in all the stories of such a size and shape as to admit of convenient, symmetrical, well lighted, and desirable interior divisions, and at the same time to economize in space and cost of construction.

In houses, as above mentioned, built in rows with front and back buildings, as usually constructed, the first story of the front building contains the parlor and hall, while the dining-room is generally in the back building and is poorly lighted, the length of the parlor being in this construction the length of the front building in all the stories and is insufficient to make two desirable-sized rooms over it in each of the second and upper stories. In my construction the front building is made long enough in the first story to contain the parlor and hall, together with a dining room in the rear of them, extending the whole width of the said front building. The same-sized front building in the second and upper stories would be undesirable, as the back one of the two rooms into which it would be divided in each story would be too long and poorly proportioned; but making the front building in the second and upper stories shorter than the front building in the first story by a distance less than the width of the dining room gives a convenient size to the back room of the front building in the second or upper stories, a part of its length of its full width, thus being directly above the dining room, places the bath-room, while in the back building of the second story, over the front building of the first story, giving it a communicating door with the back room of the front building and thus allowing the back stairway, by being placed back of the bath room, to have a landing in the first story back of the dining-room, and at the same time, by using the space of the ceiling of the back part of the front building of the first story left uncovered by making the front building in the second and upper stories shorter than in the first story as a skylight or window in addition to the other window, giving to the dining-room much greater and sufficient light. In this construction the width instead of the length of the dining room, as in the old way, is a part of the total length of the house, thereby shortening the length and consequently diminishing the cost of construction.

In the accompanying drawings similar letters of reference refer to similar parts throughout.

Figure 1 is a plan view of the first floor of a building containing my improvement. Fig. 2 is a plan view of the second floor. Fig. 3 is a side elevation of a building containing my improved construction, partially in section, on the line *x x* of Fig. 1.

A A′ are respectively the side walls of the front building. B is the front wall, and B′ the rear wall, of the front building of the first story. F is the partition dividing the front and back rooms of the first story front building.

C C′ are the side walls, respectively, of the back building. A girder G, of wood or metal, extends across the front building, between the partition and the rear wall B′ *i. e.* over the dining room at or near the level of the second story floor, from the wall A′ to the wall A and is built therein. It is located at a distance from the wall B′—say six or seven feet.

A longitudinal girder G′ is built into the side wall C and forms a continuation therewith to the girder G, to which it is connected and by which it is supported at that end. Upon the girder G is built the rear wall $B^2$ of the second and upper floors of the front building, while the side wall C of the second and upper stories of the back building is continued and built upon the girder G′ and connected with the wall $B^2$. It will thus be seen that the second and upper stories of the front building will not extend as far rearward as the first story of the front building. By this construction the second story front building can be divided into symmetrical rooms of nearly equal size while the rooms of the first story front building can be properly proportioned for parlor and dining room. The rear room of the first story of the main building which is above termed the "dining-room," can be advantageously lighted by a skylight S, constructed in the space where the wall $B^2$ recedes. A window may also be provided in the rear wall B′.

Having now fully described my invention, what I claim and desire to protect by Letters Patent, is—

1. A combination of the parallel walls A and A′ the transverse girder G, the longitudinal girder G′ with the wall $B^2$ supported on the transverse girder G, and part of the longitudinal wall C supported on the longitudinal girder G′ and the partition F between the parlor and dining-room, arranged in the manner and for the purpose substantially as described.

2. A dwelling house having front and back buildings in which the first story front building is constructed into a front room or parlor and a hallway together with a back room or dining-room in the rear of them, and in which the second story front building is shortened and the second story back building is lengthened by dividing between them that part of the length of the house which in the first story is the width of the dining-room by constructing the wall $B^2$ and a part of the wall C on the girders G and G′, respectively, and in which the full width and part of the length of the back room of the second story front building extends over a portion of the dining room, substantially as described.

In testimony of which invention I have hereunto set my hand.

JAMES I. COMLY

Witnesses:
HARRY BRODHEAD,
M. F. ELLIS.